(12) United States Patent
Zhang et al.

(10) Patent No.: US 9,477,904 B2
(45) Date of Patent: Oct. 25, 2016

(54) SYSTEMS AND METHODS FOR REFINING BUILDING ALIGNMENT IN AN AERIAL IMAGE

(71) Applicant: HERE Global B.V., Veldhoven (NL)

(72) Inventors: Xi Zhang, Chicago, IL (US); Xin Chen, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 359 days.

(21) Appl. No.: 14/153,515

(22) Filed: Jan. 13, 2014

(65) Prior Publication Data

US 2015/0199557 A1 Jul. 16, 2015

(51) Int. Cl.
*G06K 9/48* (2006.01)
*G06K 9/62* (2006.01)
*G06K 9/00* (2006.01)

(52) U.S. Cl.
CPC ......... *G06K 9/6202* (2013.01); *G06K 9/00637* (2013.01)

(58) Field of Classification Search
CPC ................... G06K 9/6202; G06K 9/00637
See application file for complete search history.

(56) References Cited

PUBLICATIONS

Wendel et al., "Automatic Alignment of 3D Reconstructions using a Digital Surface Model", Jun. 25, 2011, IEEE, CVPR 2011 Workshops, p. 29-36.*

Wang et al., "A Robust Approach for Automatic Registration of Aerial Images with Untextured Aerial LiDAR Data", Jun. 25, 2009, IEEE, Conf. on Computer Vision and Pattern Recognition 2009, p. 2623-2630.*
Stretcha et al., "Dynamic and Scalable Large Scale Image Reconstruction", Jun. 18, 2010, IEEE, Conf. on Computer Vision and Pattern Recognition 2010, p. 406-413.*
Zhou et al., "Fast and Extensible Building Modeling from Airborne LiDAR Data", Nov. 7, 2008, ACM, Proc. of the 16th ACM SIGSPATIAL Int. Conf. on Advances in Geographic Information Systems, p. 1-8.*
Christopher C. Miller, "A Beast in the Field: The Google Maps Mashup as GIS/2", Cartographica, Fall, 2006, pp. 187-199, vol. 41, No. 3.
U.S. Appl. No. 14/076,636, filed Nov. 11, 2013.

* cited by examiner

*Primary Examiner* — Stephen R Koziol
*Assistant Examiner* — Timothy Choi
(74) *Attorney, Agent, or Firm* — Lempia Summerfield Katz LLC

(57) ABSTRACT

Systems, apparatuses, and methods are provided for refining building alignment in an aerial image. At least one candidate shifting vector and matching score value are determined for a local building. At least one dominant shifting vector is determined for at least one random group of neighboring buildings of the local building. At least one optimized matching score is calculated using the at least one candidate shifting vector for the local building and the at least one dominant shifting vector for the at least one random group of the neighboring buildings. A final shifting vector for the local building is found using the at least one optimized matching score.

20 Claims, 7 Drawing Sheets

SYSTEMS AND METHODS FOR REFINING BUILDING ALIGNMENT IN AN AERIAL IMAGE

FIELD

The following disclosure relates to image processing, and, in particular methods and systems for refining building alignment in an aerial image.

BACKGROUND

A building roof top in the aerial image may often not be aligned correctly with its building footprint. Such a misalignment may be problematic for large scale three-dimensional mapping and modeling in an urban area with multiple tall buildings. Additionally, buildings may not be correctly aligned with their respective footprints because of image degradation (e.g., noise, occlusion, and shadows). In conventional mapping and modeling systems, buildings are typically aligned one building at a time. Such conventional systems may not efficiently process building alignment on a large scale. Therefore, providing improved methods for refining building alignments is continuing effort.

SUMMARY

Systems, apparatuses, and methods are provided for refining building alignment in an aerial image. In one embodiment, the method comprises determining, using a processor, at least one candidate shifting vector and matching score value for a local building in an aerial image. The method further comprises determining at least one dominant shifting vector for at least one random group of neighboring buildings of the local building. The method further comprises calculating at least one optimized matching score using the at least one candidate shifting vector for the local building and the at least one dominant shifting vector for the at least one random group of the neighboring buildings. The method further comprises finding a final shifting vector for the local building using the at least one optimized matching score.

In another embodiment, the method comprises determining, using a processor, at least one candidate shifting vector and matching score value for a local building in an aerial image. The method further comprises determining a dominant shifting vector for a random group of neighboring buildings of the local building. The method further comprises determining an optimized matching score using the at least one candidate shifting vector for the local building and the dominant shifting vector for the random group of the neighboring buildings. The method further comprises iteratively determining new dominant shifting vectors for new random groups of the neighboring buildings and determining new optimized matching scores using the new dominant shifting vectors. The method further comprises determining a final shifting vector for the local building using the optimized matching score and the new optimized matching scores.

In one embodiment, the apparatus comprises at least one processor and at least one memory including computer program code for one or more programs; the at least one memory and the computer program code configured to, with the at least one processor, cause the apparatus to at least perform: (1) determine at least one candidate shifting vector and matching score value for a local building in an aerial image; (2) determine at least one dominant shifting vector for at least one random group of neighboring buildings of the local building; (3) calculate at least one optimized matching score using the at least one candidate shifting vector for the local building and the at least one dominant shifting vector for the at least one random group of the neighboring buildings; and (4) find a final shifting vector for the local building using the at least one optimized matching score.

BRIEF DESCRIPTION OF THE DRAWINGS

Exemplary embodiments are described herein with reference to the following drawings.

DETAILED DESCRIPTION

The following embodiments include the systems and methods for refining building alignment in an aerial image. Analysis techniques and computer algorithms may be used to develop an improved, refined aerial image through the collection and processing of an aerial or satellite image. An aerial image is typically captured by a camera on an airplane flying thousands of meters above the earth's surface, while a satellite image is typically captured by a camera on a satellite orbiting several hundred kilometers above the earth's surface. Unless otherwise specified, the term "aerial image" will refer to both aerial and satellite images.

After an aerial image is captured, the aerial image is analyzed and processed in a building alignment refining system. Typically, the aerial image is correlated with its geographic location, and buildings within the aerial image may be individually aligned with their respective base or ground-level building footprints. Buildings within an aerial image generally align well with the base of corresponding building. However, buildings in aerial images are typically captured at an angle between a top-down view (perpendicular to the ground) and ground level view. At such an angle, the buildings have an oblique projection and appear to be tilted. Thus, the rooftop building footprint may be displaced or shifted from the ground-level building footprint.

Figure 1:
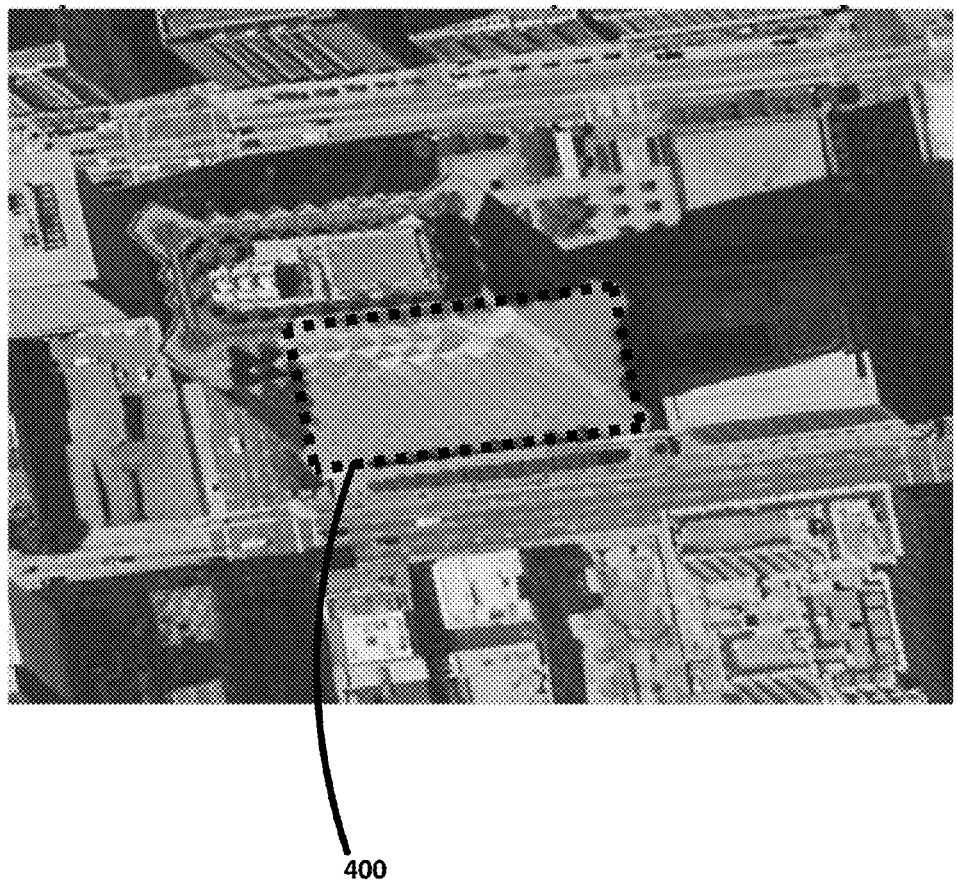
FIG. 1 illustrates an example of an aerial image of a building with its ground-level building footprint.

FIG. 1 illustrates a non-limiting example of an aerial image having an oblique projection and apparent tilt. The dotted line 400 represents the ground-level building footprint. As shown in FIG. 1, due to the oblique projection and apparent tilt of the building, the ground-level footprint does not correspond or match with the rooftop footprint.

To solve a large scale rooftop footprint matching problem, the process may include determining the rooftop building footprint for a local building, or a select number of local buildings. For each local building, an algorithm is used to determine or match the rooftop building footprint based upon its known ground-level or base building footprint. An edge-matching algorithm may be used to determine an initial shifting vector for the local building. The edge-matching algorithm may be a Chamfer matching algorithm or a Hausdorff distance calculation algorithm.

Edge-matching algorithms, such as Chamfer matching, may be used to find a match between two binary edge images that are generated by extracting edges from two normal images (e.g., a template image and a target image). Given one binary image (e.g., the template image) to find a match in another binary image (e.g., the target image), the edge-matching algorithm moves the template image over the entire target image. In each location, the edge-matching algorithm may compute a matching score between template and target, where a higher score represents a better match. Once scores are computed for every location on the target image, the edge-matching algorithm (e.g., Chamfer matching) will determine the location with highest score as the optimal matching location for the rooftop building footprint. Thus, given the initial location of the ground-level building footprint, the result generated by the edge-matching algorithm may include a shifting vector pointing from ground level building footprint to the optimal matching location for the rooftop.

Edge-matching algorithms for local buildings, such as Chamfer matching, may be limited in their overall accuracy. For example, in certain embodiments, the accuracy of Chamfer matching may only reach about 85%.

In some embodiments, a majority of buildings within the same area will accurately match with their ground-level footprints using Chamfer matching, and only a few buildings will get an incorrect matching location. Therefore, for a building with an incorrect rooftop footprint match (and incorrect shifting vector), shifting vectors of the neighboring buildings may be used to correct the rooftop footprint match and shifting vector.

In other words, in certain embodiments, a local building's shifting vector may be determined based upon the shifting vectors of the local building's surrounding buildings. In certain embodiments, a dominant shifting vector of neighboring buildings is calculated to determine the local building's shifting vector. That is, a local building's shifting vector should correspond with the shifting vectors of the surrounding, neighboring buildings.

Figure 2:
FIG. 2 illustrates an example of analyzing the shifting vector of a local building based on a group of neighboring buildings within a bounding sphere.

FIG. 2 illustrates an example of analyzing the shifting vector of a local building, labeled bi, based on a group of neighboring buildings within a bounding sphere centered at bi (depicted as a shadowed circle). In certain embodiments, the bounding sphere has a radius of 10 meters, 20 meters, 50 meters, 100 meters, 200 meters, 400 meters, 800 meters, 1600 meters, etc. The bounding sphere radius may be fixed or adjusted based on the number of neighboring buildings within the area of the bounding sphere. In some embodiments, the radius of the bounding sphere is smaller (e.g., 10-100 meters) in denser urban environments.

FIG. 2 depicts the local and neighboring buildings as two-dimensional outlines having a solid circle located at the center of the building. The buildings contain an individual shifting vector as a line extending from the solid circle in the direction at which the building is shifting in an aerial view. The magnitude of the shift is represented by the length of the line (i.e., a shorter line represents a smaller aerial shift, while a longer line represents a larger aerial shift).

The process of analyzing the shifting vector of the local building (bi) involves calculating a dominant shifting vector (v) from the neighboring buildings within the bounding sphere, where n buildings are randomly chosen from within the bounding sphere. The shifting vectors for the selected neighboring buildings are analyzed to calculate a dominant shifting vector (v). In certain embodiments, the dominant shifting vector (v) is determined based on a histogram of the individual shifting vectors of the selected neighboring buildings. Each individual shifting vector from the selected neighboring buildings is placed into a particular bin or "bucket," wherein each bucket refers to a tabulated collection of shifting vectors that fall within a specified range. For example, shifting vectors having a range of directions and/or magnitudes may be placed in one bucket, while shifting vectors with a second range of directions and/or magnitudes are stored in a second bucket, etc. Based on this analysis, the dominant shifting vector (v) for the single iteration may be determined based on the bin/bucket having the peak value in the histogram.

There may be uncertainties (i.e., outliers) when calculating the dominant shifting vector (v) from the neighboring building shifting vectors. Therefore, an algorithm may be used to calculate the dominant shifting vector iteratively. In certain embodiments, a mathematical method called RANdom SAmple Consensus ("RANSAC") is used to estimate the dominant shifting vector. RANSAC is a non-deterministic algorithm that may produce a dominant shifting vector with a certain probability. The probability of getting correct dominant shifting vector is defined by the following equation:

$$1-p=(1-w^n)^k$$

where:
  p is the expected probability that the algorithm will produce an accurate result. The value for p may be determined by the user. In certain embodiments, p is set at 85%, 90%, 95%, 99%, or 99.9%. For example, p may be set at 99%, meaning the probability of determining the correct dominant shifting vector by running RANSAC is at least 99%.
  w is the probability that the local building shifting vector is an inlier when compared with the neighboring shifting vectors. In certain embodiments, w is set at 85%, since the accuracy of Chamfer matching may only achieve about 85%.
  n is the least number of samples (neighborhood building shifting vectors) that are chosen to determine a dominant shifting vector (v). In certain embodiments, n=5, 10, 15, 20, 30, 40, or 50+. In one particular embodiment, n=10.
  k is the least number of iterations of the algorithm needed to be run in order to achieve p (i.e., the expected probability of an accurate result).

Therefore, based on known inputs for p, w, and n; k can be calculated as follows:

$$k = \frac{\log(1-p)}{\log(1-w^n)}$$

Therefore, in order to determine a dominant shifting vector for the neighboring buildings with a high probability of accuracy, multiple iterations of the process described above and depicted in FIG. 2 may be required. For example, where p=99%, w=85%, and n=10, approximately three iterations (k~3) of the dominant shifting vector analysis are required.

In certain embodiments, the calculated dominant shifting vector (v) for the neighboring buildings may be further processed to optimize a matching score and determine an optimized shifting vector for the local building. The optimized matching score (G) may comprise implementing an edge-matching calculation score (e.g., Chamfer matching) at each pixel of local building's aerial image. Using the edge-matching scores, the algorithm may search over the target or score image to determine a location with a matching score (si) and an associative shifting vector (vi) that can assist in determining the optimized matching score (G). In certain embodiments, the matching score (si) is determined by Chamfer matching, as discussed above. In certain embodiments, the optimized matching score (G) is calculated as follows:

$$G=a*si+b(\text{dot}<vi,v>)$$

wherein (1) si represents the matching score determined by the edge-matching algorithm (e.g., Chamfer matching), (2) vi represents the associative, candidate shifting vector determined by an edge-matching algorithm, (3) v represents the dominant shifting vector, (4) dot<vi, v> represents the inner product of the two vectors (v and vi), (5) a represents any value between and including 0 and 1, and (6) b equals 1–a. In one particular embodiment, a=0.4 (and therefore b=0.6).

In certain embodiments, it may be cost prohibitive to search over an entire target or score image of the building (bi) for each iteration of RANSAC. Therefore, a candidate shifting vector of building (bi) may be generated from its score image before running RANSAC. Thus, in certain embodiments, during each iteration of RANSAC, the algorithm only searches for si and vi among these candidates. Based on the iterations of the dominant shifting vector and optimized matching score, a final shifting vector for the local building may be determined based on the highest score determined from all of the combined scores calculated.

In certain embodiments, given a building bi's score image, a candidate shifting vector (si) is determined by searching for a local maximum, i.e., a position with the largest score in a local area. The search for a local maximum may be conducted by one or more methods such as a gradient ascent search method or a region grow method. In one particular embodiment, a candidate shifting vector is determined by searching for a local maximum using a gradient ascent search method. In such a method, the algorithm searches for a location which has a zero gradient and the largest matching score within a domain around it.

In some embodiments, the process of searching for a local maximum is conducted by determining certain regions of the local area that have a high matching score (i.e., regions that meet a threshold level), and then only searching for the local maximum within those highlighted regions of the local area.

Figure 3:
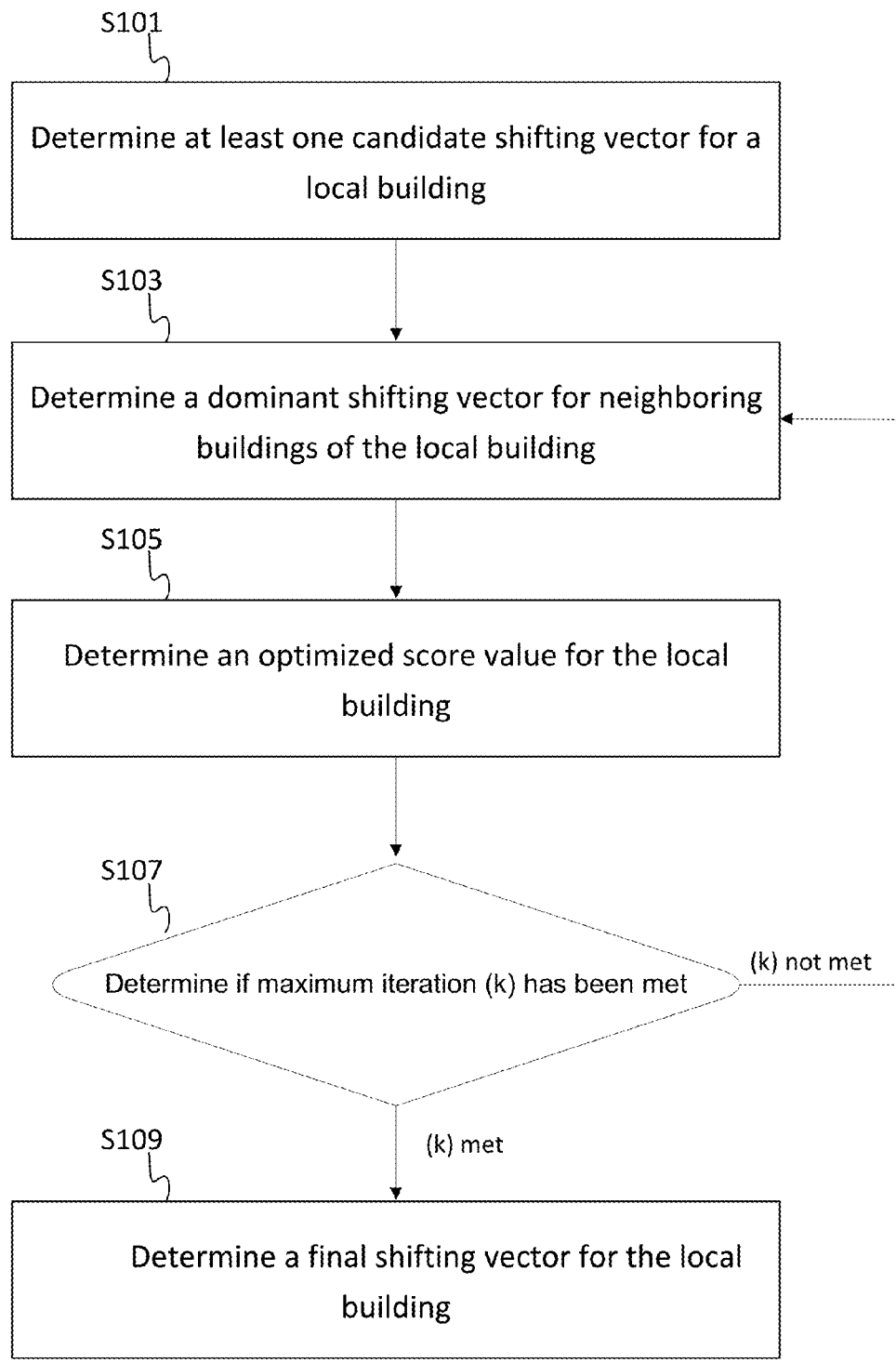
FIG. 3 illustrates an example flowchart for refining building alignment in an aerial image.

FIG. 3 illustrates an example flowchart for refining building alignment in an aerial image. The process of the flowchart may be performed by a mobile device or personal computer and controller and/or server and processor. Alternatively, another device may be configured to perform one or more of the following acts. Additional, fewer, or different acts may be included.

At act S101, the processor selects a local building (bi) for analysis, determines an initial shifting vector for the building. The initial shifting vector is determined by analyzing at least one candidate shifting vector and its corresponding matching score for the building and selecting the shifting vector with the highest matching score as the initial shifting vector for the local building. The initial shifting vector calculation may be completed using an edge-matching algorithm, such as Chamfer matching, as discussed above.

At act S103, the processor determines a dominant shifting vector (v) for the neighboring buildings of the local building (bi). In this act, n buildings are randomly selected from within a specified bounding sphere of local building (bi).

The shifting vectors for the selected neighboring buildings (n) are analyzed to calculate the dominant shifting vector (v) using a mathematical method called RANSAC. In certain embodiments, the dominant shifting vector (v) is determined based on a histogram of the individual shifting vectors of the selected neighboring buildings, as discussed above.

At act S105, the processor determines an optimized matching score for local building bi. As discussed above, the optimized matching score (G) is determined from the matching score from an edge-matching algorithm (si) and the combination of both the dominant shifting vector (v) and the candidate shifting vector (vi).

At act S107, a determination is made if the maximum iteration (k) has been met. If it has not, the process returns to act S103. If the maximum iteration has been met, the process continues to act S109.

At act S109, the final shifting vector for the local building is determined based on the highest score determined from all of the k combined scores calculated.

The processor may typically complete the acts in the flowchart in a matter of seconds or less than a second, wherein the matching accuracy of the shifting vector for the building improves from 85% to above 90%, above 95%, or above 99%.

In certain embodiments, following the process of finding the final shifting vector for one local building, the process may be repeated for additional local buildings. In some embodiments, the final shifting vector from one local building may be stored and used in the determination of a final shifting vector for another local building or buildings. Additionally, in other embodiments, the determination of the dominant shifting vector for one random group of neighboring buildings may be stored and used in the determination of a final shifting vector for another local building or buildings.

In certain embodiments, following the process of finding a final shifting vector for the local building, an adjusted building footprint or rooftop building footprint is determined or rendered in an aerial map. The rooftop building footprint is determined and rendered using the final shifting vector and the initial ground-level footprint.

Figure 4:
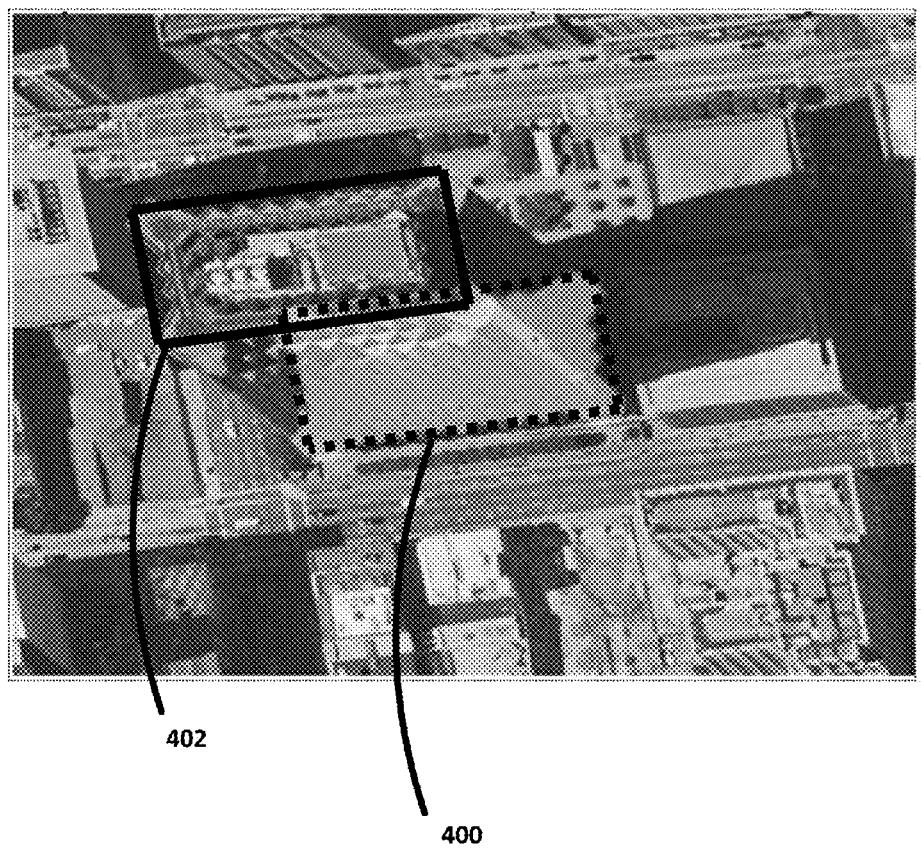
FIG. 4 illustrates an example of an aerial image of a building with its corrected rooftop building footprint.

One result of running the algorithm is depicted in FIG. 4, wherein the initial location of footprint is shown with the grey shadow and outlined with the dotted line 400, and the location of the rooftop footprint, as corrected by running the algorithm, is outlined with a solid line 402.

Figure 5:
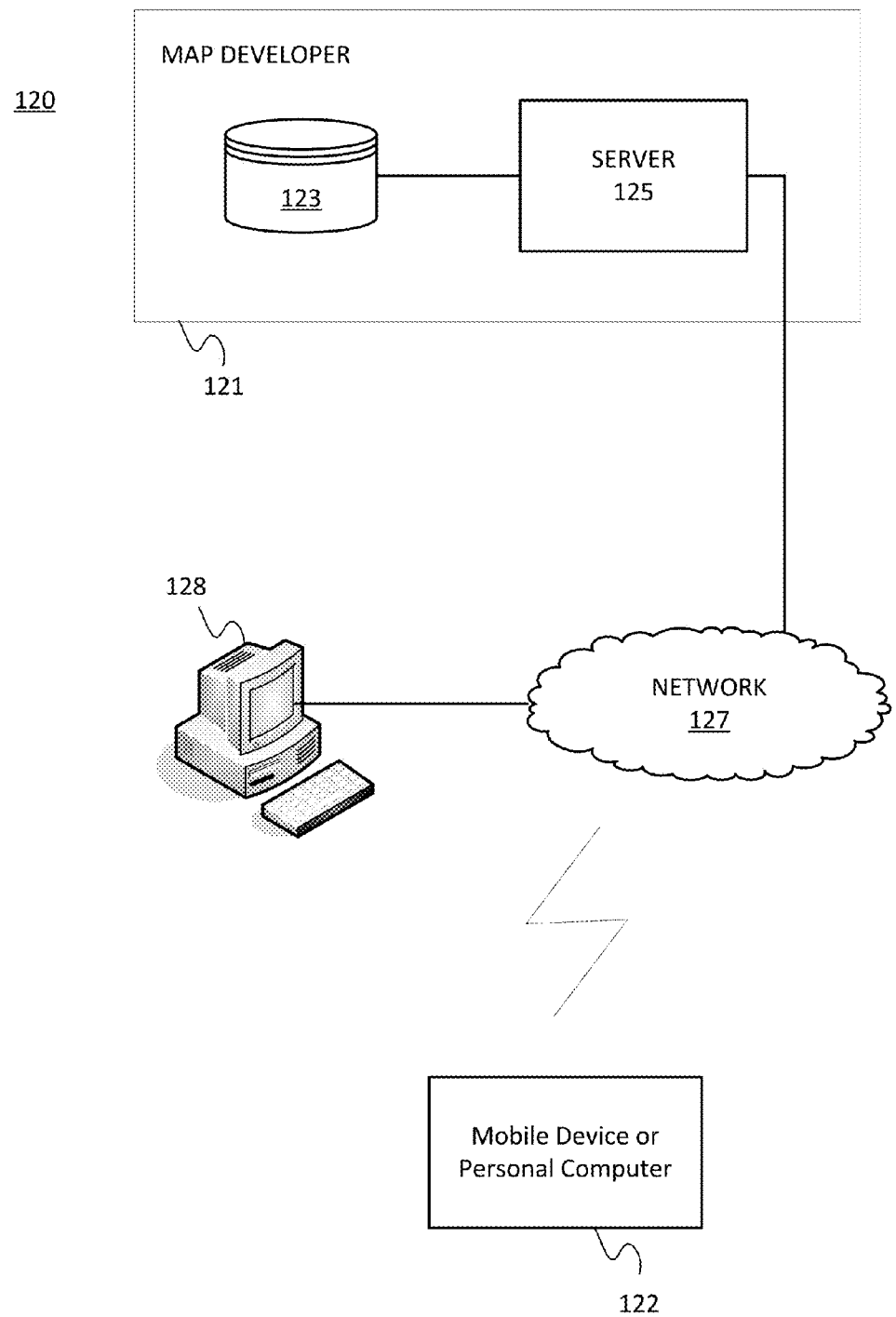
FIG. 5 illustrates an example system of a building alignment refining system.

As discussed above, refining building alignment in an aerial image may be performed by a mobile device or personal computer and controller and/or server and processor. FIG. 5 illustrates one embodiment of a building alignment refining system 120. The refining system 120 may include a map developer system 121, a mobile device or personal computer 122, a workstation 128, and a network 127. Additional, different, or fewer components may be provided.

The mobile device or personal computer 122 may be a smart phone, a mobile phone, a personal digital assistant ("PDA"), a tablet computer, a notebook computer, a desktop computer, a personal navigation device ("PND"), a portable navigation device, and/or any other known or later developed mobile device or personal computer.

The developer system 121 includes a server 125 and a database 123. The developer system 121 may include computer systems and networks of a system operator such as HERE, NAVTEQ or Nokia Corporation. The database 123 is configured to store aerial images provided from an aerial camera or satellite camera, as well as refined building alignment images processed by the server and algorithm. The server 125 is configured to receive an aerial image from the aerial camera or satellite camera and analyze/process the image to form a refined building alignment image.

The developer system 121, the workstation 128, and the mobile device or personal computer 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests mobile device 122 to relay current geographic locations. The workstation 128 may be used to enter data indicative of GPS accuracy to the database 123. The workstation 128 may include at least a memory, a processor, and a communication interface.

Figure 6:
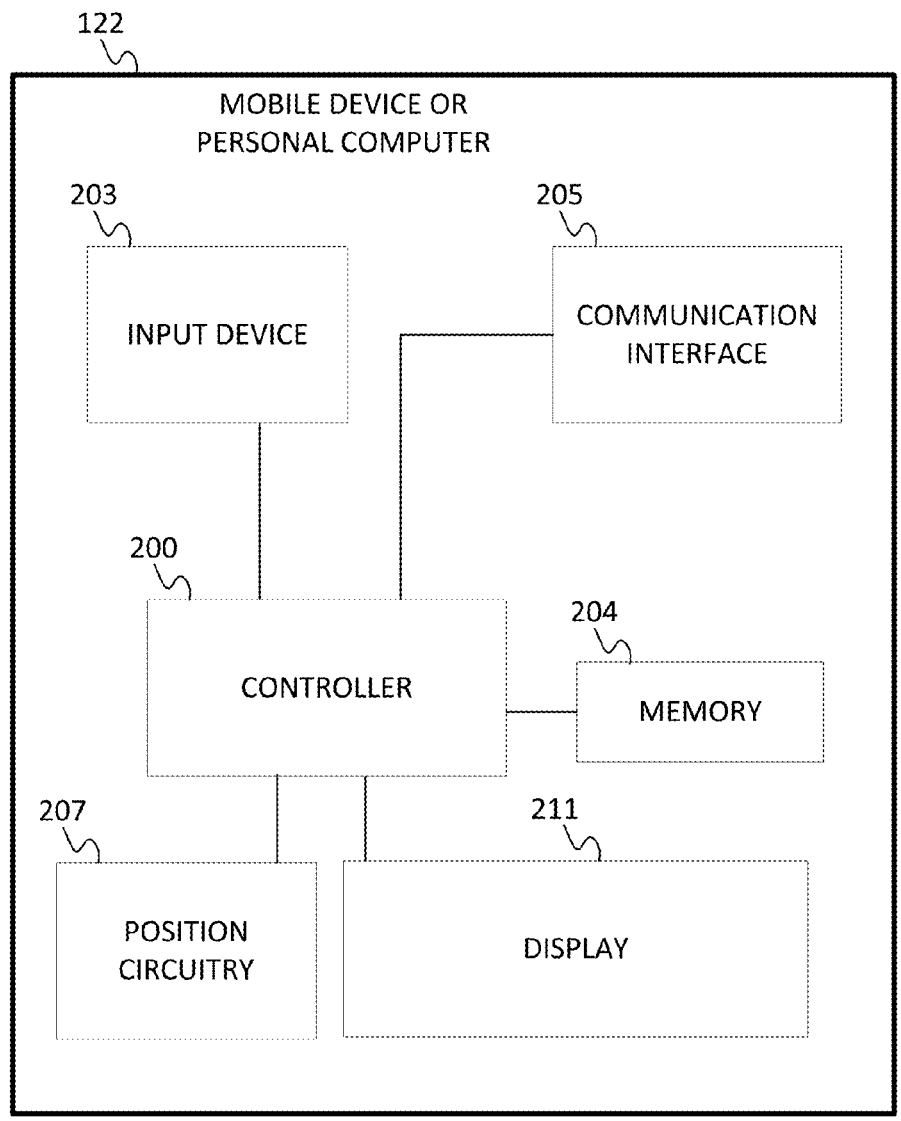
FIG. 6 illustrates an exemplary mobile device of the system of FIG. 5.

FIG. 6 illustrates an exemplary mobile device or personal computer 122 of the system of FIG. 5. The mobile device or personal computer 122 includes a controller 200, a memory 204, an input device 203, a communication interface 205, position circuitry 207, and a display 211. Additional, different, or fewer components are possible for the mobile device/personal computer 122.

The controller 200 may be configured to receive data indicative of the location of the mobile device 122 from the position circuitry 207. The positioning circuitry 207, which is an example of a positioning system, is configured to determine a geographic position of the mobile device 122. The positioning circuitry 207 may include sensing devices that measure the traveling distance, speed, direction, and so on, of the mobile device 122. The positioning system may also include a receiver and correlation chip to obtain a GPS signal. The positioning circuitry may include an identifier of a model of the positioning circuitry 207. The controller 200 may access the identifier and query a database or a website to retrieve the accuracy of the positioning circuitry 207 based on the identifier. The positioning circuitry 207 may include a memory or setting indicative of the accuracy of the positioning circuitry.

Alternatively or additionally, the one or more detectors or sensors in the positioning circuitry 207 may include an accelerometer and/or a magnetic sensor built or embedded into or within the interior of the mobile device 122. The positioning circuitry 207 may include a Global Positioning System (GPS), Global Navigation Satellite System (GLONASS), or a cellular or similar position sensor for providing location data.

Figure 7:
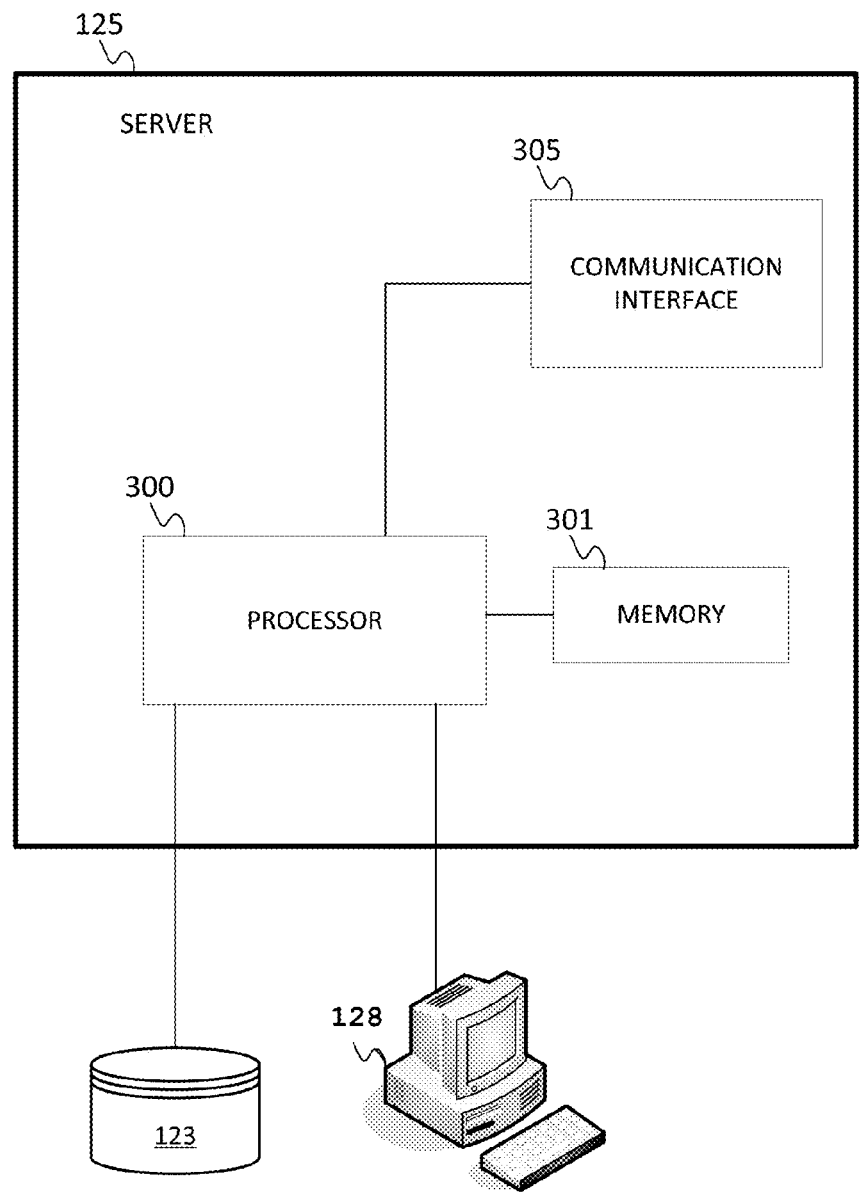
FIG. 7 illustrates an exemplary server of the system of FIG. 5.

FIG. 7 illustrates an exemplary server 125 of the building alignment refining system of FIG. 5. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. The communication interface 305 receives data indicative of use inputs made via the workstation 128 or the mobile device or personal computer 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The controller 200 and/or processor 300 may also be configured to cause an apparatus to at least perform at least one of the building realignment methods described above. For example, the controller 200 and/or processor 300 may be configured to perform the process: (1) determine at least one candidate shifting vector and matching score value for a local building in an aerial image; (2) determine at least one dominant shifting vector for at least one random group of neighboring buildings of the local building; (3) calculate at least one optimized matching score using the at least one candidate shifting vector for the local building and the at least one dominant shifting vector for the at least one random group of the neighboring buildings; and (4) find a final shifting vector for the local building using the at least one optimized matching score.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method comprising:
    determining, using a processor, at least one candidate shifting vector and matching score value for a local building in an aerial image;
    determining at least one dominant shifting vector for at least one random group of neighboring buildings of the local building;
    calculating at least one optimized matching score using the at least one candidate shifting vector for the local building and the at least one dominant shifting vector for the at least one random group of the neighboring buildings; and
    finding a final shifting vector for the local building using the at least one optimized matching score.

2. The method of claim 1, further comprising realigning a building footprint of the local building using the final shifting vector for the local building.

3. The method of claim 1, further comprising finding additional final shifting vectors for additional local buildings using (a) the at least one dominant shifting vector for the at least one random group of neighboring buildings and/or (b) the final shifting vector for the local building.

4. The method of claim 1, wherein the at least one dominant shifting vector is determined based on a histogram of individual shifting vectors of the at least one random group of neighboring buildings.

5. The method of claim 1, wherein the at least one dominant shifting vector is determined with an expected probability of accuracy using a random sample consensus algorithm.

6. The method of claim 5, wherein the random sample consensus algorithm is conducted for a minimum number of iterations necessary, wherein the minimum number of iterations is calculated based on: (a) the expected probability of accuracy, (b) a number of sample buildings chosen in the at least one random group of neighboring buildings, and (c) a probability that the at least one candidate vector of the local building is an inlier when compared with the at least one dominant shifting vector.

7. The method of claim 1, wherein the at least one candidate shifting vector for the local building is determined using an edge-matching algorithm.

8. The method of claim 1, wherein at least one optimized matching score (G) is calculated, wherein:

$$G=a*si+b(\text{dot}<vi,v>)$$

wherein:
vi=the at least one candidate shifting vector for the local building determined by an edge-matching algorithm
si=the matching score value for the at least one candidate shifting vector for the local building;
v=the at least one dominant shifting vector for the at least one random group of neighboring buildings of the local building;
dot<vi, v>=the inner product of the at least one candidate shifting vector and the at least one dominant shifting vector,
a=any value between and including 0 and 1; and
b=1−a.

9. The method of claim 1, wherein the at least one candidate shifting vector for the local building is determined by finding local maximum score locations and choosing a shifting vector associated with a largest matching score in the local maximum score locations.

10. The method of claim 9, wherein the local maximum score locations are found using a gradient ascent search or a region grow algorithm.

11. An apparatus comprising:
at least one processor; and
at least one memory including computer program code for one or more programs;
the at least one memory and the computer program code configured to, with the at least one processor, cause the apparatus to at least perform:
determine at least one candidate shifting vector and matching score value for a local building in an aerial image;
determine at least one dominant shifting vector for at least one random group of neighboring buildings of the local building;
calculate at least one optimized matching score using the at least one candidate shifting vector for the local building and the at least one dominant shifting vector for the at least one random group of the neighboring buildings; and
find a final shifting vector for the local building using the at least one optimized matching score.

12. The apparatus of claim 11, wherein the at least one memory and the computer program code are configured to cause the apparatus to further perform:
realign a building footprint of the local building using the final shifting vector for the local building.

13. The apparatus of claim 11, wherein the at least one dominant shifting vector is determined based on a histogram of individual shifting vectors of the at least one random group of neighboring buildings.

14. The apparatus of claim 11, wherein the at least one dominant shifting vector is determined with an expected probability of accuracy using a random sample consensus algorithm.

15. The apparatus of claim 14, wherein the random sample consensus algorithm is conducted for a minimum number of iterations necessary, wherein the minimum number of iterations is calculated based on: (a) the expected probability of accuracy, (b) a number of sample buildings chosen in the at least one random group of neighboring buildings, and (c) a probability that the at least one candidate vector of the local building is an inlier when compared with the at least one dominant shifting vector.

16. The apparatus of claim 11, wherein the at least one candidate shifting vector for the local building is determined using an edge-matching algorithm.

17. The apparatus of claim 11, wherein at least one optimized matching score (G) is calculated, wherein:

$$G=a*si+b(\text{dot}<vi,v>)$$

wherein:
vi=the at least one candidate shifting vector for the local building determined by an edge-matching algorithm
si=the matching score value for the at least one candidate shifting vector for the local building;
v=the at least one dominant shifting vector for the at least one random group of neighboring buildings of the local building;
dot<vi, v>=the inner product of the at least one candidate shifting vector and the at least one dominant shifting vector,
a=any value between and including 0 and 1; and
b=1−a.

18. The apparatus of claim 11, wherein the at least one candidate shifting vector for the local building is determined by finding local maximum score locations and choosing a shifting vector associated with a largest matching score in the local maximum score locations.

19. The apparatus of claim 18, wherein the local maximum score locations are found using a gradient ascent search or a region grow algorithm.

20. A method comprising:
determining, using a processor, at least one candidate shifting vector and matching score value for a local building in an aerial image;
determining a dominant shifting vector for a random group of neighboring buildings of the local building;
determining an optimized matching score using the at least one candidate shifting vector for the local building and the dominant shifting vector for the random group of the neighboring buildings;
iteratively determining new dominant shifting vectors for new random groups of the neighboring buildings and determining new optimized matching scores using the new dominant shifting vectors; and
determining a final shifting vector for the local building using the optimized matching score and the new optimized matching scores.

* * * * *